(12) United States Patent
Shaw

(10) Patent No.: US 12,030,572 B2
(45) Date of Patent: Jul. 9, 2024

(54) STEER AXLE KNUCKLE

(71) Applicant: Dana Heavy Vehicle Systems Group, LLC, Maumee, OH (US)

(72) Inventor: Jason A. Shaw, Maumee, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 2 days.

(21) Appl. No.: 17/657,587

(22) Filed: Mar. 31, 2022

(65) Prior Publication Data

US 2022/0332369 A1    Oct. 20, 2022

Related U.S. Application Data

(60) Provisional application No. 63/174,946, filed on Apr. 14, 2021.

(51) Int. Cl.
| | | |
|---|---|---|
| *B23K 20/00* | (2006.01) |
| *B23K 20/12* | (2006.01) |
| *B62D 7/16* | (2006.01) |
| *B62D 7/18* | (2006.01) |
| *B62D 7/20* | (2006.01) |
| *B23K 101/00* | (2006.01) |

(52) U.S. Cl.
CPC ............ *B62D 7/18* (2013.01); *B23K 20/1205* (2013.01); *B62D 7/16* (2013.01); *B62D 7/20* (2013.01); *B23K 2101/006* (2018.08)

(58) Field of Classification Search
CPC ........ B62D 7/18; B23K 20/12; B23K 20/129; B23K 2101/006
See application file for complete search history.

(56) References Cited

U.S. PATENT DOCUMENTS

| | | | | | |
|---|---|---|---|---|---|
| 3,584,708 | A | * | 6/1971 | Heck | B60T 1/065 188/71.6 |
| 4,618,159 | A | * | 10/1986 | Kozyra | B62D 7/18 280/124.136 |
| 4,878,683 | A | * | 11/1989 | Dever | B60B 27/001 280/103 |
| 5,120,150 | A | * | 6/1992 | Kozyra | B60G 7/008 403/297 |
| 5,366,233 | A | * | 11/1994 | Kozyra | B60T 1/065 280/93.512 |

(Continued)

FOREIGN PATENT DOCUMENTS

| | | |
|---|---|---|
| KR | 100779351 B1 | 11/2007 |
| WO | 2018029713 A2 | 2/2018 |

*Primary Examiner* — Erin B Saad
(74) *Attorney, Agent, or Firm* — McCoy Russell LLP

(57) ABSTRACT

A method for a steer axle knuckle of a vehicle is provided. The method comprises welding a steer arm and a tie rod arm to a knuckle body by linear friction welding. The method further includes, in one example, pairing a plurality of first contact surfaces of the knuckle body and a plurality of steer arm contact surfaces of the steer arm prior to the welding; pairing a plurality of second contact surfaces of the knuckle body and a plurality of tie rod arm contact surfaces of the tie rod arm prior to the welding. Each of the plurality of first contact surfaces, second contact surfaces, steer arm contact surfaces, tie rod arm contact surfaces is machined prior to the welding.

18 Claims, 8 Drawing Sheets

(56) References Cited

U.S. PATENT DOCUMENTS

| | | | |
|---|---|---|---|
| 5,785,332 A * | 7/1998 | Pollock | B62D 7/18 |
| | | | 301/131 |
| 5,829,768 A | 11/1998 | Kaneko et al. | |
| 6,419,250 B1 | 7/2002 | Pollock et al. | |
| 8,857,833 B2 | 10/2014 | Deierling et al. | |
| 9,327,363 B2 * | 5/2016 | Moss | F16D 51/20 |
| 11,305,580 B2 * | 4/2022 | Gregg | B60B 27/0068 |
| 2013/0062396 A1 * | 3/2013 | Davenport | B23K 20/129 |
| | | | 228/102 |
| 2015/0266511 A1 * | 9/2015 | Uicker | B23K 20/122 |
| | | | 280/124.109 |
| 2015/0298721 A1 * | 10/2015 | Suzuki | B62D 3/126 |
| | | | 29/893.34 |
| 2018/0370565 A1 * | 12/2018 | White | B62D 7/20 |
| 2022/0185369 A1 * | 6/2022 | White | B60C 23/00318 |
| 2022/0332369 A1 * | 10/2022 | Shaw | B23K 20/1205 |

\* cited by examiner

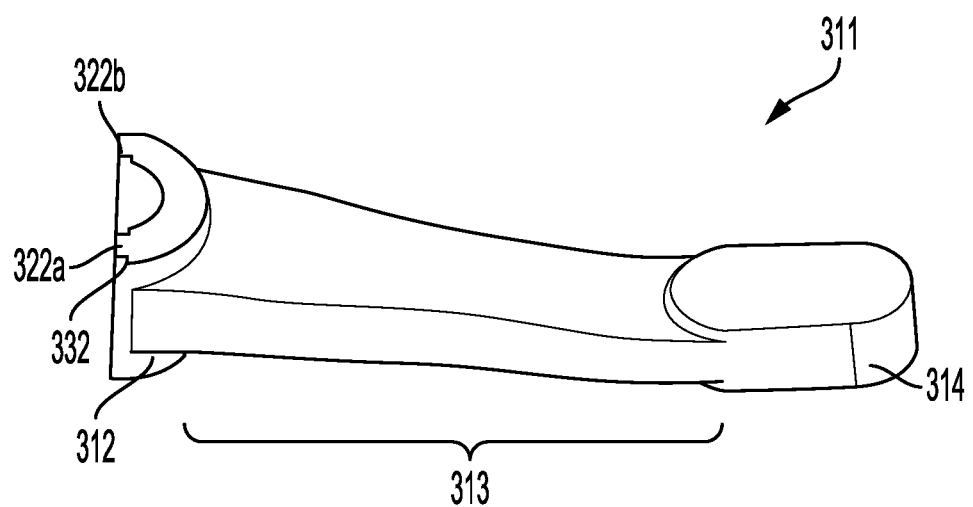
FIG. 3
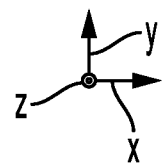

STEER AXLE KNUCKLE

CROSS REFERENCE TO RELATED APPLICATION

The present application claims priority to U.S. Provisional Application No. 63/174,946, entitled "STEER AXLE KNUCKLE", and filed on Apr. 14, 2021.

TECHNICAL FIELD

The present application relates to a vehicle suspension system. More particularly, the present application relates to a steer axle knuckle in a suspension system.

BACKGROUND AND SUMMARY

Commercial vehicles have deployed steer axle knuckles attached to suspension components of the suspension system to hold the front wheel and allows it to pivot. Typically, a steer axle knuckle comprises a knuckle body that is attached to a suspension component that allows it to pivot about an axis. The knuckle body consists of a spindle to mount a wheel hub, a steer arm to attach to the steering system drag link, and a tie rod arm to connect to a cross tube assembly.

It is known in the art that a steer axle knuckle utilized for commercial vehicle applications may have a multi piece design including steer arm and tie rod arm. Currently, such a multi piece design is achieved by attaching the steer arm and tie rod arm to the knuckle body using a tapered hole in the steer knuckle to mate to the tapered shank of the arm. Alternatively, bolt-on arms can be used with conventional threaded fasteners.

In contrast, the steer arm and tie rod arm may be integrated as part of the raw part of the steer knuckle in a single forging. Such a method may be the lightest mass option. However, having the steer arm and tie rod arm integrated as one homogenous forging/casting results in significant distortion of the arms during the forming and heat-treating process. Therefore, additional straightening operations are used to achieve the final shape. As a result, such a method requires larger allowable tolerance variation, as well as additional machining to remove excess material.

The inventor has recognized the above challenges presented by previous steer knuckle manufacturing methods and has developed a method to form a steer axle knuckle to, at least partially, overcome these challenges. The method to form a steer axle knuckle, according to an aspect of the present disclosure, comprises welding a steer arm and a tie rod arm to a knuckle body by linear friction welding. The friction between contact surfaces of the arms and the knuckle body during the linear oscillation produces heat, causing the interface material to melt and fuse together.

By having separate arms, the material can be optimized for the knuckle body and each arm. Before the linear friction welding of the arms, much of the other features of the steer knuckle can be machined. Further, the turning of the spindle may be less complex due to the lack of need for several counterbalance weights or multiple holding fixtures to accommodate the shape of multiple arms. Further still, if the linear friction welding process is completed in the same facility as the steer axle assembly process, the complexity of the finished knuckle can be controlled within one facility, which further simplifies the manufacturing process, if desired.

The method of the disclosed invention improves the steer axle knuckle's mass by eliminating the mounting features of loose arm knuckles. By using linear friction welding, the knuckle body can be turned at higher speeds to machine all features of the spindle and the brake mounting faces. Since the arms are not attached in the rough part, there will be no fixture changeovers for the turning operation that is necessary to accommodate a knuckle with various steer arm geometries.

In another example, a steer axle knuckle comprises a knuckle body, a steer arm, and a tie rod arm, wherein the steer arm and the tie rod arm are welded to the knuckle body by linear friction welding.

In another example, the knuckle body, the steer arm, and the tie arm comprise contact surfaces where the linear friction welding occurs, the contact surfaces melt during the linear friction welding.

It should be understood that the summary above is provided to introduce, in simplified form, a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 3 illustrates the steer arm of the steer axle knuckle;

DETAILED DESCRIPTION

At least FIGS. 2, 3, 4, 5, and 7 are drawn to scale.

Figure 1:
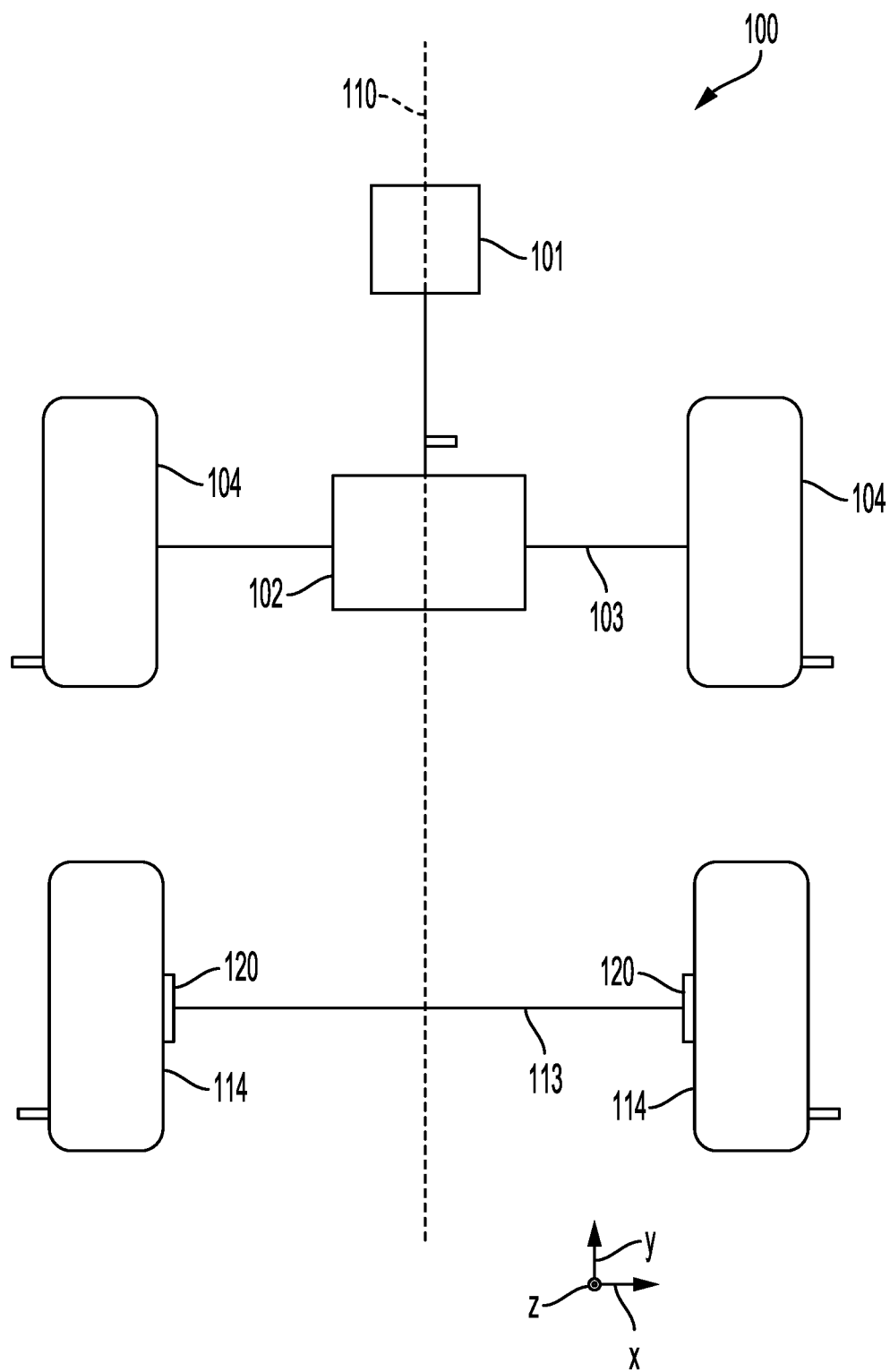
FIG. 1 schematically depicts a commercial vehicle driveline including an axle assembly according to an embodiment of the presently disclosed subject matter.

The following description relates to systems and methods for manufacturing a steer axle knuckle with steer arm and/or tie rod arm attached. Specifically, the method may include welding a steer arm and a tie rod arm to a knuckle body by linear friction welding. The method further includes, in one example, pairing a plurality of first contact surfaces of the knuckle body and a plurality of steer arm contact surfaces of the steer arm prior to the welding; pairing a plurality of second contact surfaces of the knuckle body and a plurality of tie rod arm contact surfaces of the tie rod arm prior to the welding. Each of the plurality of first contact surfaces, second contact surfaces, steer arm contact surfaces, tie rod arm contact surfaces is machined prior to the welding FIG. 1 shows a schematic diagram of a vehicle 100 that may comprise a prime mover 101 (e.g., an internal combustion engine, an electric motor, combinations thereof, and the like). The vehicle may be a hybrid vehicle. Alternatively, the vehicle may include solely an internal combustion engine. The vehicle may be a light, medium, or heavy duty type vehicle that may be designed for on-road and/or off-road travel. The prime mover 101 provides power to a drivetrain 102.

The vehicle 100 may include a first shaft 103 and a second shaft 113. The first shaft 103 may be configured to drive a first set of wheels 104 of the vehicle 100 and the second shaft 113 may be configured to drive a second set of wheels 114 of the vehicle 100. In one example, the first shaft 103 may be arranged nearer to a front of the vehicle 100 than the second shaft 113 such that the second shaft 113 is arranged nearer to a rear of the vehicle 100 than the first shaft 103.

In one example, each of the second set of wheels 114 is connected to the second shaft 113 via a steer axle knuckle 120. The two steer axle knuckles 120 are symmetrical across a longitudinal axis 110 of the vehicle 100. In another example, only one of the second set of wheels 114 is connected to the second shaft 113 via a steer axle knuckle 120.

As described in details in FIGS. 2-7, each of the steer axle knuckle comprises a steer arm and a tie rod arm that are welded to a knuckle body via linear friction welding. More details about the structural features of the steer axle knuckle and its method of manufacturing are presented herein.

Figure 2:
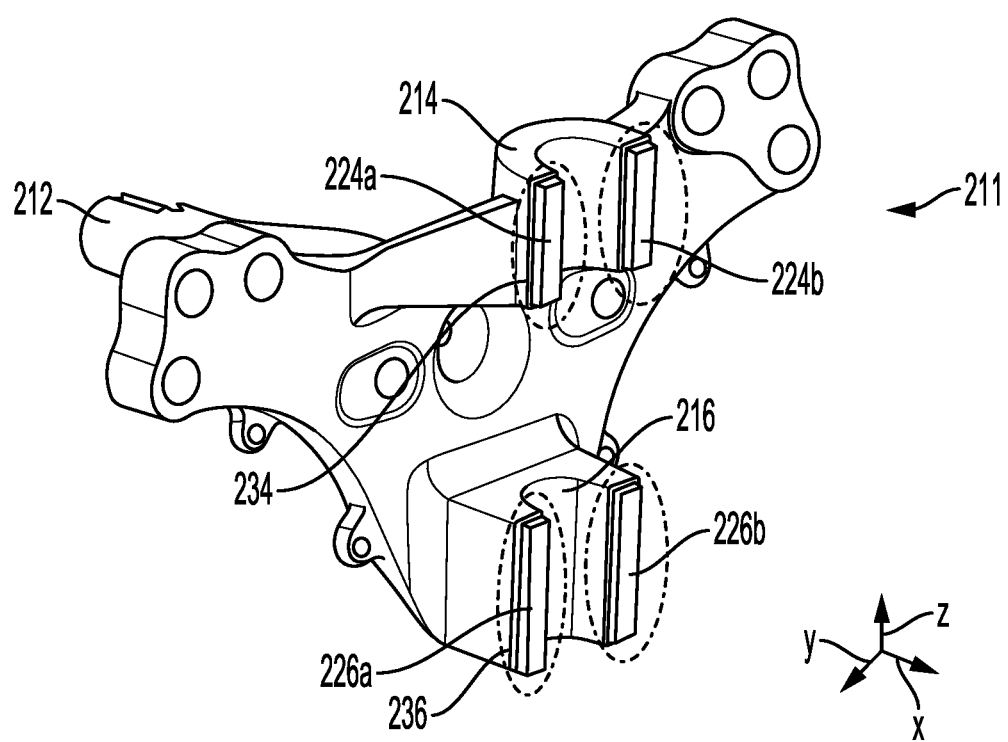
FIG. 2 illustrates the knuckle body of the steer axle knuckle.

FIG. 2 illustrates a knuckle body of a steer axle knuckle, prior to welding. As shown in FIG. 1, the knuckle body 211 according to an example of the present application includes an attached spindle 212, a steer arm attachment body 214, and a tie rod arm attachment body 216. The steer arm attachment body 214 comprises a semi-circular shape, and is configured to directly attach to a steer arm. The tie rod arm attachment body 216 comprises a semi-circular shape, and is configured to directly attach to a tie rod arm. The steer arm attachment body 214 and the tie rod arm attachment body 216 are aligned along the z-axis to allow a knuckle pin to pass through. It should be appreciated that the knuckle body 211 may be formed from a suitable material using a suitable process as desired.

In this example, the steer arm attachment body 214 comprises a plurality of first contact surfaces 224a and 224b. The first contact surfaces 224a and 224b are elevated from a base surface 234 of the steer arm attachment body 214. A size of each of the first contact surfaces 224a and 224b is smaller than a peripheral area of a cross section of the steer arm attachment body 214. The first contact surfaces 224a and 224b may be composed of the same material as the rest of the knuckle body 211.

The tie rod arm attachment body 216 comprises a plurality of second contact surfaces 226a and 226b. The second contact surfaces 226a and 226b are elevated from a base surface 236 of the tie rod arm attachment body 216. A size of each of the second contact surfaces 226a and 226b is smaller than a peripheral area of a cross section of the tie rod arm attachment body 216. The second contact surfaces 226a and 226b may be composed of the same material as the rest of the knuckle body 211. The first and second contact surfaces may all be in a common plane, such as the z-y plane in this example.

FIG. 3 illustrates a steer arm of the steer axle knuckle.

A steer arm 311 comprises a first end 312, a mid-section 313, and a second end 314. The first end 312 comprises a semi-circular shape and is configured to be attached to the plurality of first contact surfaces 224a, 224b of the knuckle body 211. The second end 314 is configured to be in contact with a drag link assembly, for example. The mid-section 313 is a continuous arm that connects the first end 312 and the second end 314, wherein the mid-section 313 is tilted clockwise relative to the x-axis so that the first end 312 is higher than the second end 314 along the y-axis. It should be appreciated that a length and a tilted angle of the mid-section 313 of the steer arm 311 may vary. It should also be appreciated that the steer arm 311 may be formed from any suitable material using any suitable process as desired.

Specifically, the first end 312 of the steer arm 311 comprises a plurality of steer arm contact surfaces 322a and 322b. The steer arm contact surfaces 322a and 322b are elevated from a base surface 332 of the first end 312 of the steer arm 311. A size of each of the steer arm contact surfaces 322a and 322b is smaller than a peripheral area of the base surface 332 of the first end 312. The steer arm contact surfaces 322a and 322b may be composed of the same material as the rest of the steer arm 311.

Figure 4:
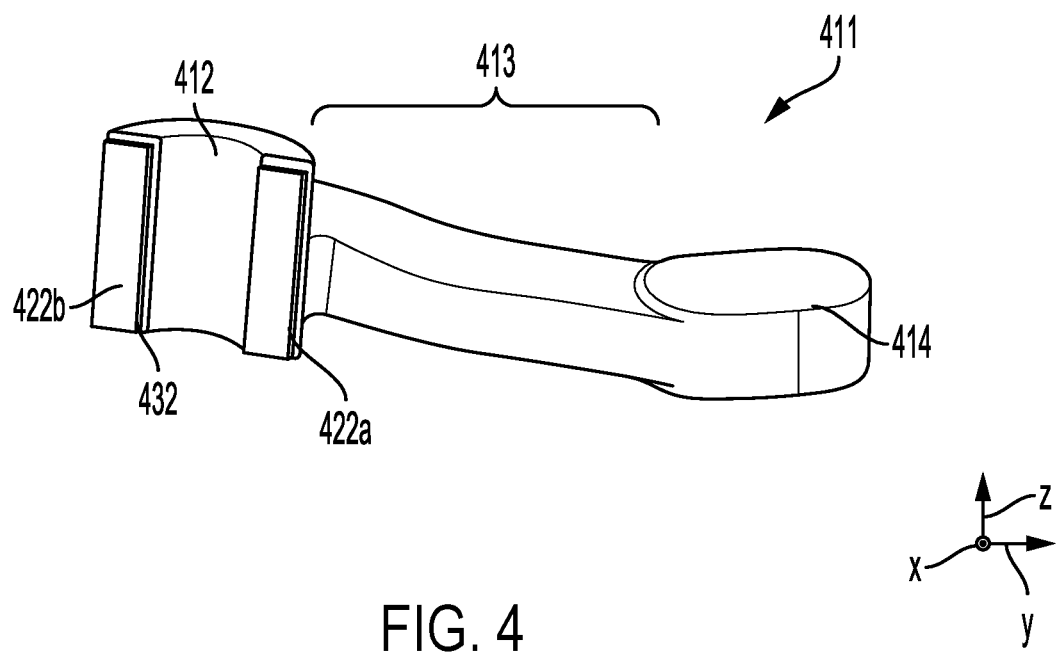
FIG. 4 illustrates the tie rod arm of the steer axle knuckle.

FIG. 4 illustrates a tie rod arm 411. Tie rod arm 411 comprises a first end 412, a mid-section 413, and a second end 414. The first end 412 comprises a semi-circular shape, and is configured to be attached to the plurality of second contact surfaces 226a, 226b of the knuckle body 211. The second end 414 is configured to be connected to a cross tube assembly. The mid-section 413 is a continuous arm that connects the first end 412 and the second end 414, wherein the mid-section 413 is tilted clockwise relative to the y-axis so that the first end 412 is higher than the second end 414 along the x-axis. It should be appreciated that a length and a tilted angle of the mid-section 413 of the tie rod arm 411 may vary. It should also be appreciated that the tie rod arm 411 may be formed from a suitable material using a suitable process as desired.

Specifically, the first end 412 of the tie rod arm 411 comprises a plurality of tie rod arm contact surfaces 422a and 422b. The tie rod arm contact surfaces 422a and 422b are elevated from a base surface 432 of the first end 412 of the tie rod arm 411. A size of each of the tie rod arm contact surfaces 422a and 422b is smaller than a peripheral area of a cross section of the first end 412 of the tie rod arm 411. The tie rod arm contact surfaces 422a and 422b may be composed of the same material as the rest of the tie rod arm 411.

Figure 5:
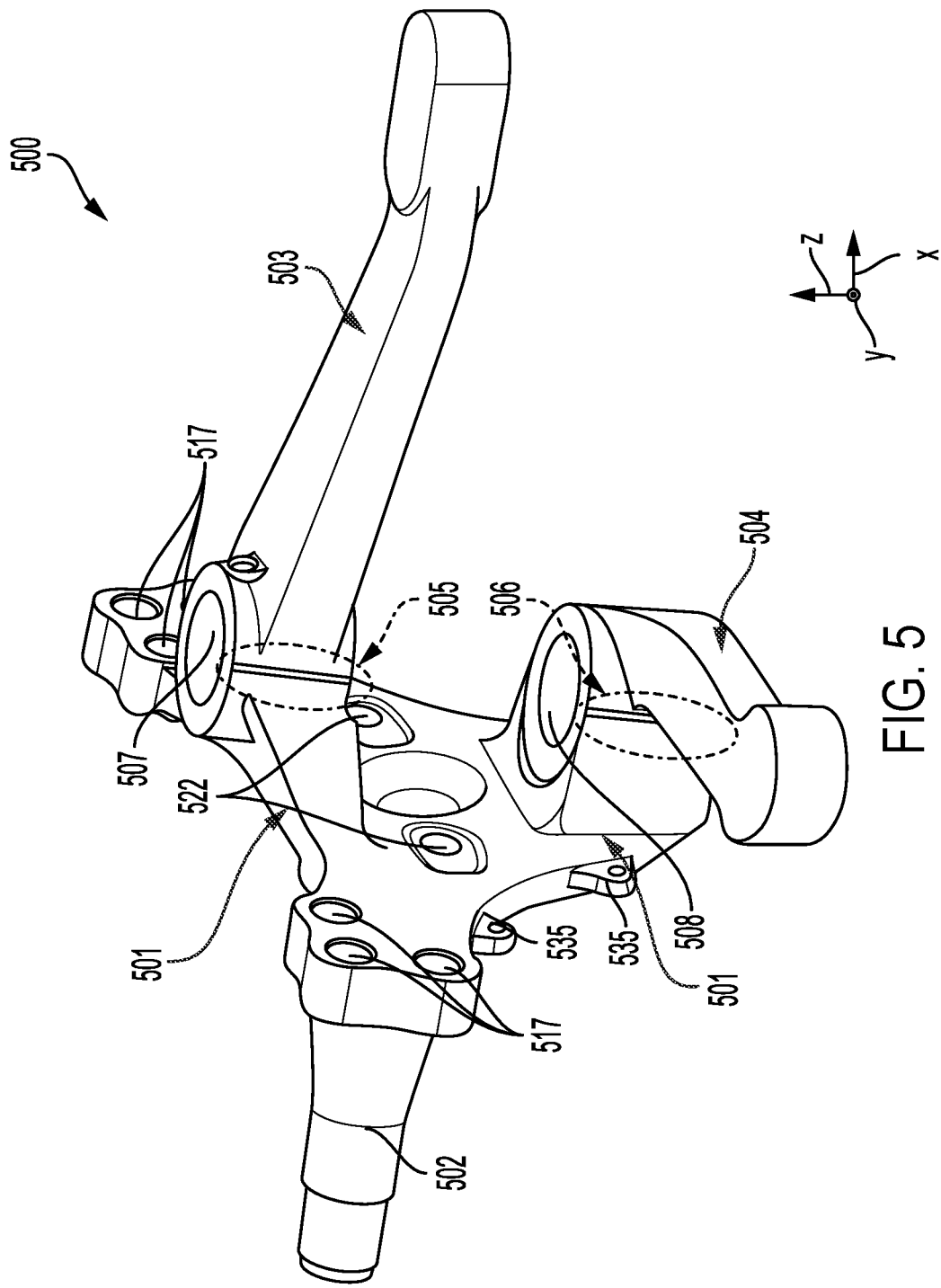
FIG. 5 is a beam side view of the steer axle knuckle with the steer arm and tie rod arm attached.

FIG. 5 is an illustration of the steer axle knuckle 500 made by the method as described in the present application. The knuckle body 501 is connected to a spindle 502 on a wheel side 511, and welded to a steer arm 503 and a tie rod arm 504 on a beam side 512. The beam side 512 is closer to the longitudinal axis 110 of the vehicle 100 as compared to the wheel side 511. As shown in FIG. 5, the knuckle body 501 is welded to the steer arm 503 and the tie rod arm 504 via a plurality of welded joints 505, 506.

In particular, the knuckle body 501 is welded to the steer arm 503 at a plurality of welded joints 505. When welded, the knuckle body 501 and steer arm 503 form a circular bearing 507. The steer arm 503 is oriented along the x-axis toward the longitudinal axis 110 of the vehicle 100. Further, the knuckle body 501 is welded to the tie rod arm 504 at a plurality of welded joints 506. When welded, the knuckle body 501 and tie rod arm 504 form a circular bearing 508. The tie rod arm 504 is oriented along the y-axis toward a rear end of the vehicle 100. The circular bearings 507 and 508 are aligned along the z-axis (e.g., so a line parallel with the z-axis may pass through the center point of circular bearings 507 and 508) to allow a knuckle pin (not shown) to pass through.

The plurality of welded joints 505 is formed by fusing the plurality of first contact surfaces 224a, 224b of the knuckle body as shown in FIG. 2 and the plurality of steer arm contact surfaces 322a, 322b as shown in FIG. 3 via linear friction welding. During the linear friction welding, the plurality of first contact surfaces 224a, 224b of the knuckle body and the plurality of steer arm contact surfaces 322*a*, 322*b* melt due to high temperature. When the welding is completed, the plurality of first contact surfaces 224*a*, 224*b* of the knuckle body and the plurality of steer arm contact surfaces 322*a*, 322*b* would fuse together. Specifically, the first contact surface 224*a* would fuse with the steer arm contact surface 322*a*, and the first contact surface 224*b* would fuse with the steer arm contact surface 322*b*.

The plurality of welded joints 506 is formed by fusing the plurality of second contact surfaces 226*a*, 226*b* of the knuckle body as shown in FIG. 2 and the plurality of tie rod arm contact surfaces 422*a*, 422*b* as shown in FIG. 4 via linear friction welding. During the linear friction welding, the plurality of second contact surfaces 226*a*, 226*b* of the knuckle body and the plurality of tie rod arm contact surfaces 422*a*, 422*b* melt under high temperature. When the welding is completed, the plurality of second contact surfaces 226*a*, 226*b* of the knuckle body and the plurality of tie rod arm contact surfaces 422*a*, 422*b* would fuse together. Specifically, the second contact surface 226*a* would fuse with the tie rod arm contact surface 422*a*, and the second contact surface 226*b* would fuse with the steer arm contact surface 422*b*.

The spindle 502 may be used to carry the hub for the wheels 104, 114 of the vehicle 100. A plurality of spindles 502 are located on all of the wheels 104, 114 of the example vehicle 100. However, a knuckle body 501 may only be affixed to a spindle 502 on the aft second set of wheels 114 of the vehicle 100.

A set of apertures 522 located near the spindle 502 are used to fasten knuckle body to body of the and/or another casted component of the vehicle 100. Wheel side fastener faces (e.g., 616 in FIG. 6) are regions that are similarly responsible for fixing the knuckle body 501 to the vehicle 100 body and/other cast components secured to the vehicle. The wheel side fastener faces (e.g., 616 in FIG. 6) are oriented along the x-axis facing toward the wheel side 511 of the vehicle 100. The wheel side fastener faces (e.g., 616 in FIG. 6) may be fastened to the body of and/or another casted component of the vehicle 100. The spindle adjacent apertures 522 and fastener face mounting apertures 517 may be defined as mounting holes. Multiple mounting holes exist on the knuckle body 501 these include mounting apertures 517, 522, and 535, all with the purpose of securing and fastening the knuckle body 501 to the vehicle 100 body or another secured casted component of the vehicle. These mounting apertures 517, 522, and 535 may be used to fasten the knuckle body 501 to the body of the vehicle 100 or to other casted components. For example, bolts may be screwed into sets of apertures in the vehicle 100 body and/or casted parts and into the mounting apertures 517, 522, and 535 to fasten the knuckle body 501 to the body of the vehicle 100. However, other methods of fastening or coupling the knuckle body 501 to the vehicle 100 and/or other casted components secured to the vehicle 100 may be possible and have been considered. Mounting apertures 517 and 522 are not labeled in FIG. 7.

Figure 6:
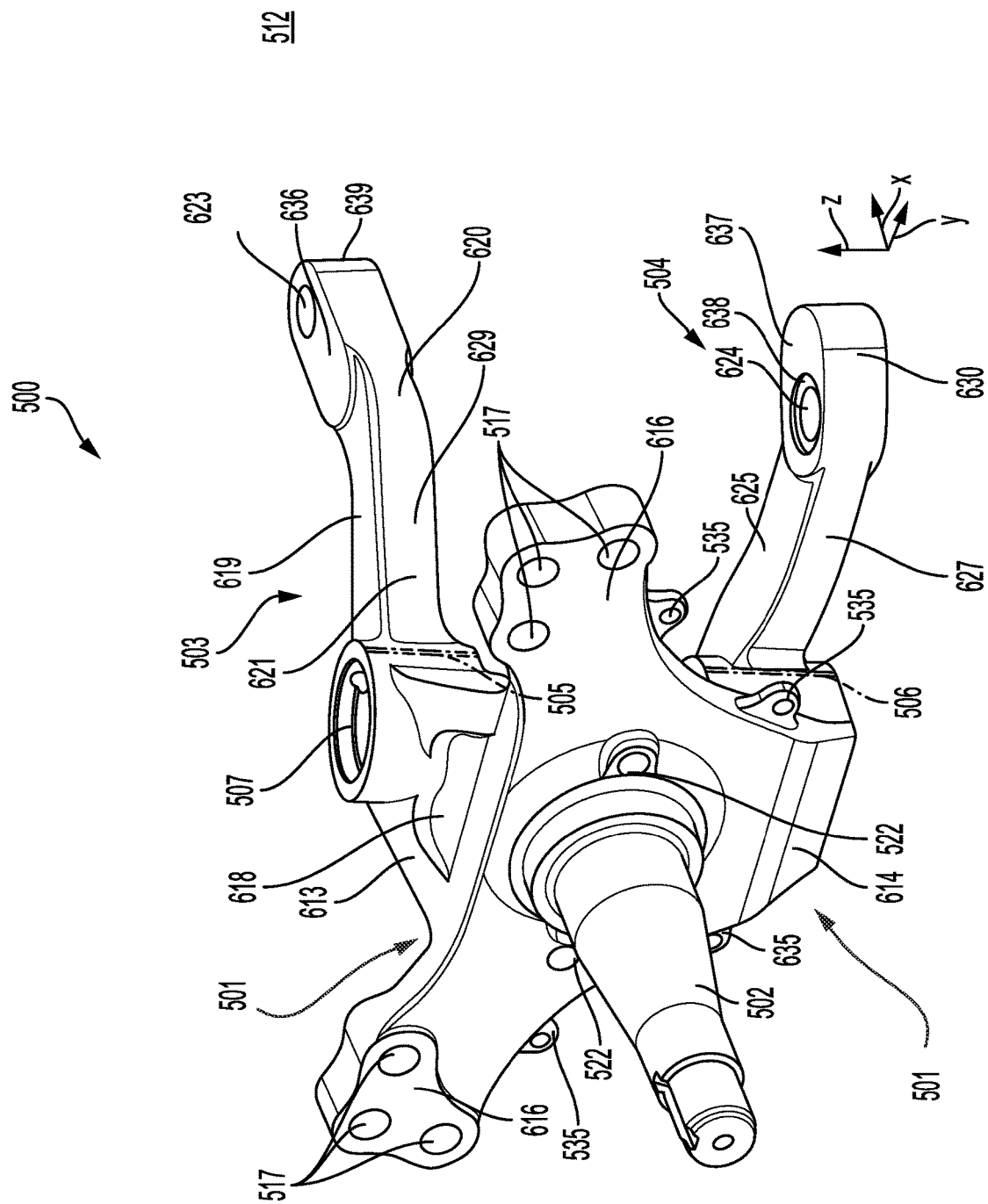
FIG. 6 is a wheel side view of the steer axle knuckle made by the method as described in the subject invention.

FIG. 6 is a wheel side view of the steer axle knuckle 500. The knuckle body 501 is connected to a spindle 602 on a wheel side 511, and welded to a steer arm (bounded by 503) and a tie rod arm (bounded by 504) on a beam side 512. The beam side 512 is closer to the longitudinal axis 110 of the vehicle 100 as compared to the wheel side 511. As shown in FIG. 5, the knuckle body 501 is welded to the steer arm 503 and the tie rod arm 504 via a plurality of welded joints.

In particular, the knuckle body 501 is welded to the steer arm 503 at a plurality of welded joints 505. When welded, the knuckle body 501 and steer arm 503 form an upper circular bearing 507. The steer arm 503 is oriented along the x-axis toward the longitudinal axis 110 of the vehicle 100. Further, the knuckle body 501 is welded to the tie rod arm 504 at a plurality of welded joints 506. When welded, the knuckle body 501 and tie rod arm 504 form a lower circular bearing 508. The tie rod arm is oriented along the y-axis toward a rear end of the vehicle 100. The circular bearings 507 and 508 formed by welding the knuckle body 501 and steer arm 503, and the knuckle body 501 and tie rod arm 504, respectively, are aligned along the z-axis to allow a knuckle pin (not shown) to pass through.

The plurality of welded joints 505 is formed by fusing the plurality of first contact surfaces 224*a*, 224*b* of the knuckle body as shown in FIG. 2 and the plurality of steer arm contact surfaces 322*a*, 322*b* as shown in FIG. 3 via linear friction welding. During the linear friction welding, the plurality of first contact surfaces 224*a*, 224*b* of the knuckle body 211 and the plurality of steer arm contact surfaces 322*a*, 322*b* melt due to high temperature. When the welding is completed, the plurality of first contact surfaces 224*a*, 224*b* of the knuckle body 211 and the plurality of steer arm contact surfaces 322*a*, 322*b* would fuse together. Specifically, the first contact surface 224*a* would fuse with the steer arm contact surface 322*a*, and the first contact surface 224*b* would fuse with the steer arm contact surface 322*b*.

The plurality of welded joints 506 is formed by fusing the plurality of second contact surfaces 226*a*, 226*b* of the knuckle body 211 as shown in FIG. 2 and the plurality of tie rod arm contact surfaces 422*a*, 422*b* as shown in FIG. 4 via linear friction welding. During the linear friction welding, the plurality of second contact surfaces 226*a*, 226*b* of the knuckle body 211 and the plurality of tie rod arm contact surfaces 422*a*, 422*b* melt under high temperature. When the welding is completed, the plurality of second contact surfaces 226*a*, 226*b* of the knuckle body 211 and the plurality of tie rod arm contact surfaces 422*a*, 422*b* would fuse together. Specifically, the second contact surface 226*a* would fuse with the tie rod arm contact surface 422*a*, and the second contact surface 226*b* would fuse with the steer arm contact surface 422*b*.

FIG. 6 shows the steer arm 503 may include several regions. FIG. 6 shows how the steer arm 503 stretches away from the knuckle body 501 into the beam side 512 and/or the longitudinal axis 110 of the vehicle 100. From the perspective of FIG. 6, the steer arm 503 possesses a vertically aligned surface 619 and a longitudinal surface 620.

The vertically aligned surface 619 possesses a face vertically aligned with the z-axis (e.g. the z-axis would intersect the surface at 90°/180° or similar angle with slight variation) and faces what would be the floor of the cabin of the vehicle 100. Mirroring the vertically aligned surface 619 is a surface/face with a similar shape on the other side of the steer arm 503. This surface on the opposite side of the steer arm 503 is not visible from the perspectives of FIG. 6 or FIG. 7. The vertically aligned surface 619 begins at the upper circular bearing 507. The vertically aligned surface 619 extends outward along the steer arm 503 deeper into the beam side 512. The vertically aligned surface 619 ends before the steer arm socket 623. The vertically aligned surface 619 transitions into another raised surface 636 that is vertically aligned and encircles the steer arm socket 623.

The longitudinal surface 620 is substantially aligned with the longitudinal axis 110 of the vehicle 100 (e.g. a line parallel with the longitudinal axis 110 or the y-axis would intersect much of the longitudinal surface 620 at 90°/180° or a similar angle with slight, or approximate, variation, such as 5%). However, due to the curve 621 in the steer arm 503 and of the longitudinal surface 620, parts of the surface face away from the longitudinal axis 110 at slight angle instead of along it. Section 629 of the longitudinal surface 620 occurs near a curve 621 in the steer arm 503. As the steer arm 503 extends from the upper circular bearing 507 into the beam side 512, it experiences a change in direction and a curve 621. At the curve 621, the steer arm 503 path starts to curves toward the y-axis. The change in the path of the steer arm 503 path cause the longitudinal surface 620 to have the section 629 that shifts in alignment so the surface faces more toward wheel side 511 in the negative x direction.

As the steer arm 503 continues to extend, its path shifts again from the y direction back toward x direction into the beam side 512. This causes the longitudinal surface 620 to revert to being longitudinally aligned. The steer arm 503 eventually stops extending into the beam side 512 x-axis. The longitudinal surface 620 continues to extend and wrap around the end of the arm extending into the beam side 512. As the longitudinal surface 620 turns, a region 639 forms. The region 639 may be considered nonaligned. Region 639 continues to change alignment as the longitudinal surface 620 continues wraps around the end and to the other side of the steer arm 503. Once the longitudinal surface 620 finishes turning to the opposite side of the steer arm 503, the longitudinal surface 620 realigns with the longitudinal axis 110. On the opposite side of the steer arm 503, the longitudinal surface 620 aligns with the longitudinal axis 110 in the negative y direction. The longitudinal surface 620 may continue to stretch along the steer arm 503, back toward the upper circular bearing 507 and the knuckle body 501 into the wheel side 511. However, the longitudinal surface 620 on the opposite side of the arm and the region 639 is not visible from the perspectives of FIG. 6 and FIG. 7.

The longitudinal surface 620 starts out wider at its start point near the upper circular bearing 507. The longitudinal surface 620 gradually tapers and shrinks in area and width upon extending out with much of the steer arm 503. However, as the longitudinal surface 620 approaches the steer arm socket 623 and a raised surface 636 of the steer arm 503, the longitudinal surface 620 begins to expand in width and area. The longitudinal surface 620 maintains the same width and area in the region 639 it curves around to the other side of the steer arm 503. The width and area of the longitudinal surface 620 only decreases on the other side of the arm as it passes the steer arm socket 623 of the steer arm 503 and the boundaries of the raised surface 636.

FIG. 6 shows the steer arm 503 vertically aligned surface 619 is smooth. The vertically aligned surface 619 has beveled edges that meet with the longitudinal surface 620. The vertically aligned surface 619 is planar in its center with only the beveled edges being rounded. The vertically aligned surface 619 in particular showcases no material connected to the upper portion 613 of the knuckle body 501 with exception to the upper circular bearing 507. Vertically aligned surface 619 is a face aligned with the vertical z-axis, facing what would be the floor of the body of the vehicle 100 if attached. On the other side of the arm is a similar face that is not visible from the perspective of FIG. 6 or FIG. 7. The vertically aligned surface 619 possesses a slight slope that gradually descends in the negative z direction. The slope of the vertically aligned surface 619 corresponds to the tilted mid-section 313 shown in FIG. 3. The steer arm 503 stretches away from the knuckle body 501 into the beam side 512 and/or the longitudinal axis 110 of the vehicle 100.

FIG. 6 shows that the steer arm 503 comprises a longitudinal surface 620. The longitudinal surface 620 is smooth with beveled edges between it and the vertically aligned surface 619. The longitudinal surface 620 is planar in its center with only the beveled edges being rounded. The longitudinal surface 620 is aligned with the longitudinal axis 110 of the vehicle 100. The steer arm 503 has a nominal path that stretches away from the knuckle body 501 into the beam side 512 and the longitudinal axis 110 of the vehicle 100. A curve 621 forms a steer arm adjacent face as the steer arm 503 extends from the upper circular bearing 507. The curve 621 causes the steer arm 503 to bend toward the y-axis before curving back toward and terminating along the x-axis into the beam side 512. Due to the curve 621, the longitudinal surface 620 does curve to face more of the wheel side 511 in a section 629 as the steer arm 503 extends in the positive y direction. The steer arm 503 does change direction from a path along the y-axis to a path back on the x-axis toward the beam side 512. When the steer arm 503 changes position, the longitudinal surface 620 reorients to face the positive y direction without favoritism toward the wheel side 511 or beam side 512. The curve 621 of the longitudinal surface 620 corresponds to the tilted mid-section 313 shown in FIG. 3.

FIG. 6 shows how the steer arm 503 contains a steer arm socket 623. The steer arm socket 623 bores through the casting material to the opposite side of the steer arm 503. The steer arm socket 623 is designed to couple the steer arm 503 with a steering rod. The steer arm socket 623 may be created through machining or cast with the steer arm 503. However, other methods of creating the steer arm socket 623 may be used. A steering rod may be coupled to steer arm 503 in multiple ways using the steer arm socket 623. For example, a steering rod may be coupled to the steer arm 503 using a nut and bolt arrangement through the steer arm socket 623. However, other methods of coupling the steering rod and steer arm 503 may be used. The steer arm socket 623 is surrounded by a raised surface 636 that is vertically aligned. The raised surface 636 may be an oval or an ellipsis in shape. However, there may be other embodiments of the raised surface 636 with different shapes. The steer arm socket 623 is located in an upper half of the raised surface 636 closer to the beam side 512.

The area of the raised surface 636 may be substantially on the lower half extending away from the beam side 512 toward the wheel side 511. The raised surface 636 has sharp edges lacking bevels; however, beveled edges may be used if desired.

FIG. 6 shows the tie rod arm 504. From the perspective of FIG. 6, the tie rod arm 504 possesses two visible surfaces: a vertically aligned surface 625 and an x-axis aligned surface 627. FIG. 6 shows that the x-axis aligned surface 627 may curve around the tie rod arm 504 in a region 630. FIG. 6 shows the tie rod arm 504 contains a tie rod arm socket 624. FIG. 6 shows a tie rod arm socket 624 surrounded by a raised surface 637.

The vertically aligned surface 625 possess a face vertically aligned with the z-axis (e.g. the z-axis or a line parallel with the z-axis is normal to the vertically aligned surface 625) and faces what would be the floor of the cabin of the vehicle 100. Mirroring the vertically aligned surface 625, is a lower surface (not shown) with a similar shape on the other side of the tie rod arm 504. The lower surface on the opposite side of the tie rod arm 504 is not visible from the perspectives of FIG. 6 or FIG. 7.

FIG. 6 shows the majority of the x-axis aligned surface 627 is substantially aligned with the x-axis of the vehicle 100 (e.g., a line parallel with the x-axis would intersect much of the wheel side 511 x-axis aligned surface 627 at 90°/180° or similar angle with slight variation). However, due to the curving of the surface, the x-axis aligned surface 627 contains portions that face away from the x-axis at various angles. The part of the wheel side 511 x-axis aligned surface 627 most visible is a region 630 that wraps around the end of the tie rod arm 504 onto the other side of the arm. Part of the x-axis aligned surface 627 region 630 aligns more substantially with the longitudinal axis 110 compared to the x-axis. The wheel side 511 facing x-axis aligned surface 627 continues to turn around the end of the tie rod arm 504 and to the other side to face the vehicle 100 beam side 512 and longitudinal axis 110 on the opposite side of the tie rod arm 504. The axel (not shown) facing portion of the x-axis aligned surface 728 is visible in FIG. 7. The wheel side 511 facing x-axis aligned surface 627 starts out wider at its start point near the lower circular bearing 508 and gradually tapers and shrinks in area and width as it extends out with tie rod arm 504. However, as the x-axis aligned surface 627 approaches the steer arm socket 623 and raised surface 637, the x-axis aligned surface 627 begins to expand in width and area. The x-axis aligned surface 627 maintains the same width and area in the region 630 it curves around to the other side of the tie rod arm 504. The width and area of the x-axis aligned surface 627 only decreases on the other side of the tie rod arm 504. The width and area of the x-axis aligned surface 627 decreases upon passing the tie rod arm socket 624 and the boundaries of a raised surface 637 on the other side of the tie rod arm 504.

FIG. 6 shows the tie rod arm 504 contains a tie rod arm socket 624 on the raised surface 637. The tie rod arm socket 624 of the tie rod arm 504 is designed to couple with the tie rod (not shown). The tie rod arm socket 624 extends and bores through raised surface 637 to the other side of the tie rod arm 504. The tie rod arm socket 624 may be created through machining or cast with the tie rod arm 504. However, other methods of creating the tie rod arm 504 socket may exist and have been contemplated. The tie rod may be coupled to tie rod arm 504 in multiple ways using the tie rod arm socket 624. For example, a tie rod may be coupled to the tie rod arm 504 using a nut and bolt arrangement (not shown) through the tie rod arm socket 624. However, other methods of coupling the tie rod and tie rod arm 504 exist and have been considered.

The tie rod arm socket 624 of the tie rod arm 504 is surrounded by a raised surface 637 that is vertically aligned. The raised surface 637 is an oval in shape. The tie rod arm socket 624 is locate on the lower half of the raised surface 637 closer to knuckle body 501 and the mid-section of the tie rod arm 504. The majority of the area of the raised surface 637 area is on the lower half extending away from the knuckle body. The raised surface 637 has beveled edges on the exterior of the tie rod arm 504 and sharper edges near the tie rod arm socket 624. The socket 624 of the tie rod arm 504 is also surrounded by a ring 638 cutout into the raised surface 637. The ring 638 is meant to secure the tie rod (not shown) to the tie rod arm 504 and tie rod arm socket 624.

FIG. 6 shows the tie rod arm 504 possesses a smooth surface, beveled edges, and a polynomial shape. The vertically aligned surface 625 and the wheel side 511 facing x-axis aligned surface 627 of the tie rod arm 504 similar features to vertically aligned surface 619 and longitudinal surface 620 on the steer arm 503.

FIG. 6 shows the knuckle body 501 has two wheel side fastener faces 616. Wheel side fastener faces 616 are regions responsible for fixing the knuckle body to the body of the vehicle 100 or another casted component already affixed to the vehicle 100. The wheel side fastener faces 616 are oriented along the x-axis away the longitudinal axis 110 and toward the wheel side 511 of the vehicle 100. The wheel side fastener faces 616 are spread apart and extend outward from the upper portion 613 of the knuckle body 501 much like a pair of antlers. This leaves the upper portion 613 of the knuckle body 501 and the upper circular bearing 507 with little material around it. It also contributes to the knuckle body 501 having a vaguely y shape from the perspective of FIG. 6.

Wheel side fastener faces 616 are fastened to the body of the vehicle 100 or casted components already secured to the vehicle 100 with the mounting apertures 517. Other mounting holes that serve a similar purpose include the apertures 522 directly adjacent to the spindle 502 and apertures 635 below the wheel side fastener faces 616.

The surfaces of the upper portion 613 of the knuckle body 501 flat with beveled edges. The upper portion 613 of the knuckle body 501 does not possess much casting material between the wheel side fastener faces 616 and the upper circular bearing 507 of the steer arm 503. Additionally, the upper portion 613 of the knuckle body 501 possesses a noticeable cutout 618 that extends from the wheel side 511 face of the upper portion 613 of the knuckle body 501 to the outer edge of the upper circular bearing 507. The absence of casting material between the wheel side fastener faces 616 and the cutout 618 contribute to the knuckle body 501 having a vaguely y shaped appearance. The cutout 618 further reduces required casting material to manufacture and the weight of the knuckle body 501. The plurality of welded joints 505 is the only region of the knuckle body 501 fused or connected to the steer arm 503. The welded joints 505 are friction welded. The strength provided by friction welded joints 505 also means less material is required on the upper portion 613 of the knuckle body 501 to support the steer arm 503. The strength provided by the welded joints 505 allows for the steer arm 503 to possess the described streamline and polynomial curved shape. This steer arm 503 is more streamline, has reduced weight, and requires less material to manufacture.

The lower region 614 of the knuckle body 501 facing the wheel side 511—located below the spindle 502—is also flat, with smooth faces and beveled edges. This lower region 614 transitions from a face perpendicular to the length of the spindle 502 to one that retreats away the wheel side and toward the axel of the vehicle 100. The lower face of the lower region 614 of the knuckle body 501 terminates near the lower circular bearing 508. The edges of mid-section and lower region 614 of the knuckle body 501 arch downward in a parabolic fashion from the location of the wheel side fastener faces 616 toward the lower region 614 of the knuckle body 501. This parabolic path further adds to the y shape of the knuckle body 501. The vaguely arch like curve helps to support and strengthen the wheel side fastener faces 616 and structure of the entire knuckle body 501. The arch like curves also reduce mass and casting material required for manufacturing from the knuckle body 501.

Figure 7:
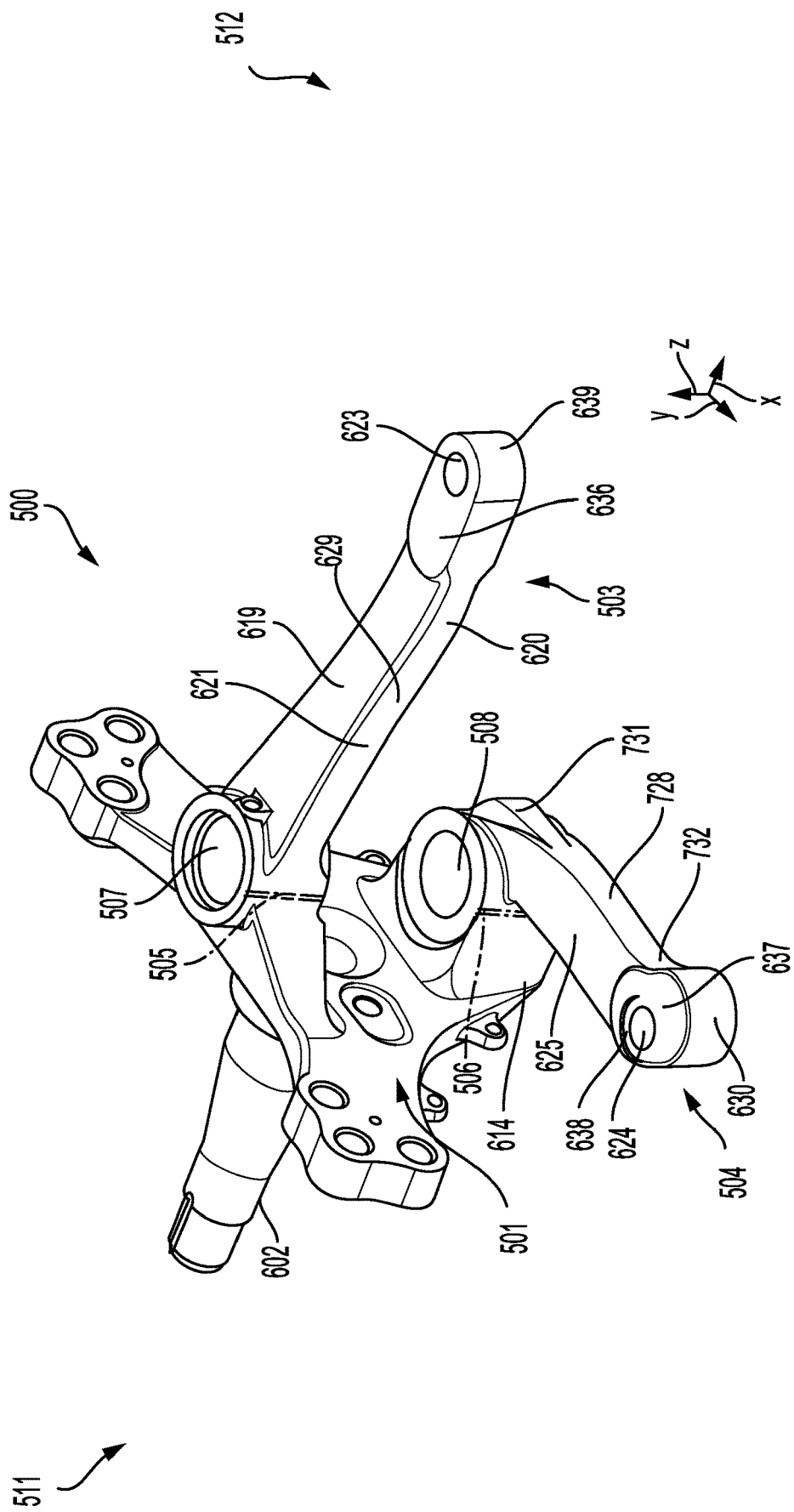
FIG. 7 is a top view of the steer axle knuckle made by the method as described in the subject invention.

FIG. 7 shows a top view of the steer axle knuckle 500 made by the method as described in the present application. The knuckle body 501 is connected to a spindle 502 on a wheel side 511, and welded to a steer arm 503 and a tie rod arm 504 on a beam side 512. The beam side 512 is closer to the longitudinal axis 110 of the vehicle 100 as compared to the wheel side 511. As shown in FIG. 5, the knuckle body 501 is welded to the steer arm 503 and the tie rod arm 504 via a plurality of welded joints.

In particular, the knuckle body 501 is welded to the steer arm 503 at a plurality of welded joints 505. When welded, the knuckle body 501 and steer arm 503 form a circular bearing 507. The steer arm 503 is oriented along the x-axis toward the longitudinal axis 110 of the vehicle 100. Further, the knuckle body 501 is welded to the tie rod arm 504 at a plurality of welded joints 506. When welded, the knuckle body 501 and tie rod arm 504 form a circular bearing 508. The tie rod arm is oriented along the y-axis toward a rear end of the vehicle 100. The circular bearings 507 and 508 are aligned along the z-axis to allow a knuckle pin (not shown) to pass through.

The plurality of welded joints 505 is formed by fusing the plurality of first contact surfaces 224a, 224b of the knuckle body as shown in FIG. 2 and the plurality of steer arm contact surfaces 322a, 322b as shown in FIG. 3 via linear friction welding. During the linear friction welding, the plurality of first contact surfaces 224a, 224b of the knuckle body and the plurality of steer arm contact surfaces 322a, 322b melt due to high temperature. When the welding is completed, the plurality of first contact surfaces 224a, 224b of the knuckle body and the plurality of steer arm contact surfaces 322a, 322b would fuse together. Specifically, the first contact surface 224a would fuse with the steer arm contact surface 322a, and the first contact surface 224b would fuse with the steer arm contact surface 322b.

The plurality of welded joints 506 is formed by fusing the plurality of second contact surfaces 226a, 226b of the knuckle body as shown in FIG. 2 and the plurality of tie rod arm contact surfaces 422a, 422b as shown in FIG. 4 via linear friction welding. During the linear friction welding, the plurality of second contact surfaces 226a, 226b of the knuckle body and the plurality of tie rod arm contact surfaces 422a, 422b melt under high temperature. When the welding is completed, the plurality of second contact surfaces 226a, 226b of the knuckle body and the plurality of tie rod arm contact surfaces 422a, 422b would fuse together. Specifically, the second contact surface 226a would fuse with the tie rod arm contact surface 422a, and the second contact surface 226b would fuse with the steer arm contact surface 422b.

FIG. 7 shows another view of the tie rod arm 504. FIG. 7 shows a vertically aligned surface 625 and an x-axis aligned surface 728. The vertically aligned surface 625 is vertically aligned. There is little no additional casting to the vertically aligned surface 625 to the knuckle body 501 and the circular bearing 508. FIG. 7 shows the vertically aligned surface 625 and the x-axis aligned surface 728 are smooth and connected by beveled edges.

FIG. 7 shows the tie rod arm 504 possess polynomial shape when viewed from down the z-axis. This polynomial shape may have two inflection points. The first inflection point occurs as the tie rod arm 504 extends from circular bearing 508 toward the beam side 512. Initially the arm extends more along the beam side 512 positive x-axis direction before sharply curving along a path more in line with the positive y-axis direction displayed in FIG. 7. As the tie rod arm 504 extends to tie rod arm socket 624, the tie rod arm 504 shifts once more in direction more towards the beam side 512 direction of the x-axis. The shape and simpler design the arm in the patent example, helps increase the strength of the tie rod arm 504. The tie rod arm 504 also possesses a reduced weight due to less material and is less likely to possess defects when cast due to the more simplistic design of the tie rod arm 504.

FIG. 7 shows the tie rod arm 504 is composed of a few key regions, some are repeated from FIG. 6 while others are novel. From the perspective of FIG. 7, the tie rod arm 504 possesses a vertically aligned surface 625 and an x-axis aligned surface 627. The vertically aligned surface 625 possess a face vertically aligned with the z-axis, facing what would be the floor of the body of the vehicle 100. Mirroring the vertically aligned surface 625 is a surface/face with a similar shape (not shown) on the other side of the tie rod arm 504. The surface/face on the opposite side of the tie rod arm 504 is not visible from the perspectives of FIG. 6 or FIG. 7.

The x-axis aligned surface 728 is substantially aligned with the x-axis (e.g. a line parallel with the x-axis of the vehicle 100 would intersect much of the x-axis aligned surface 627 at 90°/180° or similar angle with slight variation) at a slight angle. The x axis aligned surface 728 also faces the beam side 512. The x-axis aligned surface 728 curves sharply as it approaches the tie rod arm socket 624. Due to the curve, a section 732 of the x-axis aligned surface 728 aligns more substantially with the longitudinal axis 110 of the vehicle 100 compared to the x-axis.

Beyond the section 732 and tie rod arm socket 624, the x-axis aligned surface 728 wraps around the tie rod arm socket 624. Past the tie rod arm socket 624, the x-axis aligned surface 728 forms the region 630 shown in FIG. 6. The region 630 wraps around the tie rod arm socket 624. The x-axis aligned surface 728 steadily changes alignment in region 630 as the x-axis aligned surface 728 wraps around the tie rod arm socket 624. A portion of the region 630 realigns with beam side 512 of the x-axis before continuing to turn. The region 630 continues to turn, the region 630 increasingly aligns with the y-axis and longitudinal axis 110 of the vehicle 100. The region 630 may also begin to face the wheel side 511. Once the region 630 faces the wheel side 511, the x-axis aligned surface 728 transitions into the x-axis aligned surface 627 shown in FIG. 6. The beam side 512 facing x-axis aligned surface 728 wraps around the tie rod arm 504 to the opposite side. On the opposite side of the tie rod arm 504, the beam side 512 facing x-axis aligned surface 728 and becomes the x-axis aligned surface 627 facing the wheel side 511 visible in FIG. 6.

For FIG. 7, the beam side 512 facing x-axis aligned surface 728 can be followed from the region 630 along the tie rod arm 504 to bearing 508. The x-axis aligned surface 728 facing the beam side 512 starts out wider as in the region 630 that wraps around the end of the tie rod arm 504 and the tie rod arm socket 624. However, as x-axis aligned surface 728 and region 630 approach the end of raised surface 637, it rapidly diminishes in area and width. This is approximately at section 732 of the x-axis aligned surface 728 where the tie rod arm 504 curves away from a path along the y-axis and more toward beam side 512 in the positive x direction. The beam side 512 facing x-axis aligned surface 728 begins to gradually expand in area and width as it approaches the circular bearing 508 of the tie rod arm 504.

As the tie rod arm 504 approaches the circular bearing 508, a beveled elbow 731 emerges from the x-axis aligned surface 728. The beveled elbow 731 provides support to the tie rod arm 504 while reducing weight and strain on the plurality of welded joints 506 that form the lower circular bearing 508. The beveled elbow 731 possesses 3 faces. Two of the faces of the beveled elbow 731 are vertically aligned with the z-axis and parallel to the vertically aligned surfaces 619, 625 of the steer arm 503 and tie rod arm 504. Only the upward face (e.g., z-axis aligned surface facing the cabin of the vehicle 100) of the beveled elbow 731 is visible in FIG. 7. The Downward face (e.g., z-axis aligned surface facing the road or plane the vehicle 100 is resting on) of the beveled elbow 731 is not visible in FIG. 7. One of the faces of the beveled elbow 731 is x-axis aligned and parallel with much of the x-axis aligned surface 728. Above and below the beveled elbow 731, the rest of the x-axis aligned surface 728 curves toward the y-axis as it approaches the lower circular bearing 508.

The plurality of welded joints 506 is the region of the knuckle body 501 fused or connected to the tie rod arm 504. The welded joints 506 are friction welded. The strength provided by friction welded joints 506 also means less material is required on the lower region 614 of the knuckle body 501 to support the tie rod arm 504. The strength provided by the welded joints 506, allows for the tie rod arm 504 to possess the described streamline and polynomial curved shape. This more streamlined tie rod arm 504 has reduced weight and requires less material to manufacture.

FIG. 7 shows the steer arm 503 composed of the same regions as FIG. 6. From the perspective of FIG. 7, the steer arm 503 possesses two visible surfaces: a vertically aligned surface 619 and a longitudinal surface 620. The vertically aligned surface 619 possesses a face vertically aligned with the z-axis, facing what would be the floor of the body of the vehicle 100. Mirroring the vertically aligned surface 619 is a surface/face (not shown) with a similar shape on the other side of the steer arm 503. This surface/face on the opposite side of the steer arm 503 is not visible from the perspectives of FIG. 6 or FIG. 7. On the other side of the arm is a similar face that is not visible from the perspective of FIG. 6 or FIG. 7. The longitudinal surface 620 possesses a face with a majority aligned with the longitudinal axis 110 of the vehicle 100. However, due to the curve 621, part of the section 629 that faces the away from the longitudinal axis 110 at an angle instead of along it. The steer arm 503 curve 621 is more accurately depicted—if less pronounced—in FIG. 7 compared to FIG. 6. The region 639 of the longitudinal surface 620 that curves around the steer arm 503 is more visible in FIG. 7. The longitudinal surface 620 shown is present on the opposite side of the arm, but is not visible from the perspectives of FIG. 6 or FIG. 7.

FIG. 7 shows the steer arm 503 has surfaces 619, 620 these are the same surfaces 619, 620 displayed in FIG. 6 from a different perspective. The vertically aligned surface 619 in particular showcases the smooth and planar qualities of the surface. The vertically aligned surface 619 of the steer arm 503 begins on the knuckle body 501 where the circular bearing 507 is formed. The start point of the vertically aligned surface 619 wraps around the circular bearing 507 and possesses almost the same width as the diameter of the circular bearing 507. The steer arm 503 and its vertically aligned surface 619 extends out toward the longitudinal axis 110 of the vehicle 100. As the vertically aligned surface 619 travels toward the end of the arm its area and width diminish and taper. The vertically aligned surface 619 ends before the raised surface 636 surrounding the steer arm socket 623.

Due to the perspective of FIG. 7, the slope of the vertically aligned surface 619 described in FIG. 6's perspective of steer arm 503 is less noticeable. When viewed along the y-axis or the longitudinal axis 110 of the vehicle 100, the steer arm 503 would appear similar to a logarithmic function approaching a value of zero. FIG. 7 shows the steer arm 503 stretches away from the knuckle body 501 into the beam side on the x-axis.

FIG. 7 shows the steer arm 503 contains a steer arm socket 623 that bores through to the other side of the steer arm 503. FIG. 7 also shows the steer arm 503 contains the raised surface 636 surrounding the steer arm socket 623 of the steer arm 503 previously described in FIG. 6. The steer arm socket 623 of the steer arm 503 is designed to couple with the steering rod (not shown). The steer arm socket 623 may be created through machining or cast with the steer arm 503. However, other methods of creating the steer arm socket 623 may exist and have been contemplated. The steering rod may be coupled to steer arm 503 in multiple ways using the steer arm socket 623. For example, the steering rod may be coupled to the steer arm 503 using a nut and bolt arrangement through the steer arm socket 623. However, other methods of coupling the steering rod (not shown) and steer arm 503 exist and have been considered.

FIG. 7 shows the tie rod arm 504 contains a tie rod arm socket 624. FIG. 7 also shows the raised surface 637 and ring 638 cutout that surround the tie rod arm socket 624 previously described in FIG. 6. The tie rod arm socket 624 is designed to couple with the steering rod (not shown). The tie rod arm socket 624 may be created through machining or cast with the tie rod arm 504. However, other methods of creating the tie rod arm 504 socket may exist and have been contemplated. The tie rod (not shown) may be coupled to tie rod arm 504 in multiple ways using the tie rod arm socket 624. For example, a tie rod may be coupled to the tie rod arm 504 using a nut and bolt arrangement (not shown) through the tie rod arm socket 624. However, other methods of coupling the tie rod and tie rod arm 504 exist and have been considered.

Figure 8:
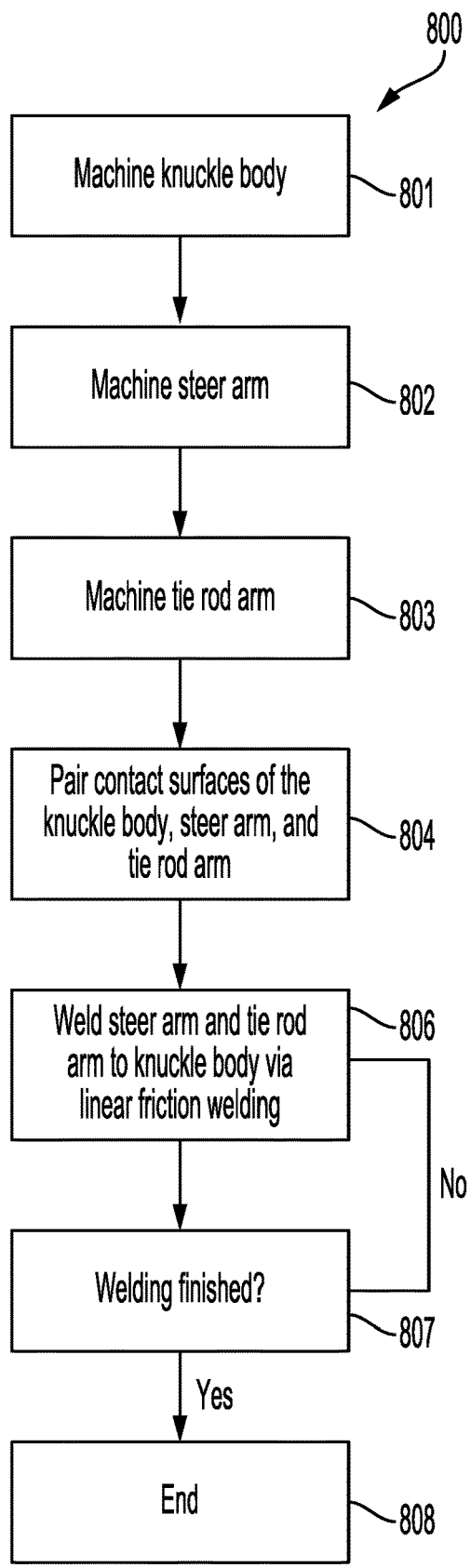
FIG. 8 is an example method to form a steer axle knuckle as described in the subject invention.

FIG. 8 is an example of the method to form a steer axle knuckle as described in the present application.

At 801, a knuckle body is machined. Specifically, the knuckle body is machined to comprise a plurality of first contact surfaces and a plurality of second contact surfaces, the plurality of first and second contact surfaces elevated from a base surface of the knuckle body. The plurality of first contact surfaces are machined to locate at an end of a semi-circular shaped steer arm attachment body of the knuckle body; the plurality of second contact surfaces are machined to locate at an end of a semi-circular shaped tie rod arm attachment body of the knuckle body.

At 802 and 803, a steer arm and a tie rod arm are machined, respectively. The steer arm comprises a plurality of steer arm contact surfaces that are elevated from a base surface of the steer arm; the tie rod arm comprises a plurality of tie rod arm contact surfaces that are elevated from a base surface of the tie rod arm. The plurality of steer arm contact surfaces is machined to locate at an end of a semi-circular shaped end of the steer arm; the plurality of tie rod arm contact surfaces are machined to locate at an end of a semi-circular shaped end of the tie rod arm.

At 804, contact surfaces of the knuckle, the steer arm, and the tie rod arm are paired prior to the welding. For example, the plurality of first contact surfaces of the knuckle body is paired with the plurality of the steer arm contact surfaces; the plurality of second contact surfaces of the knuckle body is paired with the plurality of the tie rod arm contact surfaces. A number of the plurality of first contact surfaces of the knuckle body and a number of the plurality of the steer arm contact surfaces are the same; a number of the plurality of second contact surfaces of the knuckle body and a number of the plurality of the tie rod arm contact surfaces are the same.

At 806, the steer arm and the tie rod arm are welded to the knuckle body via linear friction welding. During the welding, temperature between each of the paired contact surfaces increase due to linear friction to a point where the material of the contact surfaces melts and fuse. In particular, the plurality of first contact surfaces of the knuckle body and the plurality of the steer arm contact surfaces would fuse together; and the plurality of second contact surfaces of the knuckle body and the plurality of the tie rod arm contact surfaces would fuse together.

At 807, the method 800 determines if the welding is finished. In one example, the determination may be made based on a temperature at the plurality of contact surfaces. The temperature may be measured by a temperature sensor located near the plurality of contact surfaces. If the temperature at the plurality of contact surfaces is above a predetermined threshold for a predetermined duration, the method 800 may proceed to 808 to end the welding process; if the temperature at the plurality of contact surfaces is not above a predetermined threshold for a predetermined duration, the method 800 may proceed to 806 to keep the welding process until conditions to end the welding process are met.

In another example, the determination at 807 may be made based on a measured thickness of the plurality of contact surfaces. If measured thickness of the plurality of first contact surfaces, the plurality of second contact surfaces, the plurality of steer arm contact surfaces, and the plurality of tie rod arm contact surfaces are below a predetermined threshold, the method 800 may proceed to 808 to end the welding process; if one of the measured thicknesses of the plurality of first contact surfaces, the plurality of second contact surfaces, the plurality of steer arm contact surfaces, and the plurality of tie rod arm contact surfaces is at or above a predetermined threshold, the method 800 may proceed to 806 to keep the welding process until conditions to end the welding process are met.

FIGS. 5-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. The specific numerical values provided herein are approximate, for example within 5%.

It is to be understood that the invention may assume various alternative orientations and step sequences, except where expressly specified to the contrary. It is also to be understood that the assemblies, devices, and methods illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise.

It will be appreciated that the configurations disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claims which follow.

The invention claimed is:

1. A method for manufacturing a steer axle knuckle, comprising:
welding a steer arm and a tie rod arm to a knuckle body by linear friction welding to form a first circular bearing having a central axis, including joining first and second parallel contact surfaces of a steer arm semi-circular shape to third and fourth parallel contact surfaces, respectively, of a first knuckle body semi-circular shape to form the first circular bearing.

2. The method of claim 1, further comprising machining the knuckle body prior to the welding.

3. The method of claim 1, further comprising machining the steer arm prior to the welding.

4. The method of claim 1, further comprising machining the tie rod arm prior to the welding.

5. A method, comprising:
forming a steer axle knuckle for a vehicle by welding a steer arm and a tie rod arm to a knuckle body by linear friction welding, wherein the steer axle knuckle includes a plurality of openings for receiving a pin along a pin axis, with a first pair of welds around the pin axis at the steer arm, and a second pair of welds around the pin axis at the tie rod arm.

6. The method of claim 5, further comprising machining the knuckle body prior to the welding, machining the steer arm prior to the welding, and machining the tie rod arm prior to the welding.

7. The method of claim 6, wherein machining the knuckle body includes forming a plurality of first contact surfaces and a plurality of second contact surfaces, and wherein the plurality of first contact surfaces and the plurality of second contact surfaces are elevated from a base surface of the knuckle body and in a common plane.

8. The method of manufacturing of claim 1, wherein the steer arm is integral with the first and second parallel contact surfaces.

9. The method of manufacturing of claim 1, wherein the first and second parallel contact surfaces are elevated from a base surface of the steer arm semi-circular shape.

10. The method of manufacturing of claim 1, wherein the third and fourth parallel contact surfaces are elevated from a base surface of the first knuckle body semi-circular shape.

11. The method of claim 1, further comprising welding the knuckle body and the steer arm by fusing a plurality of first knuckle body contact surfaces and a plurality of steer arm contact surfaces via linear friction welding, the plurality of first knuckle body contact surfaces in direct contact with the plurality of steer arm contact surfaces during linear friction welding, wherein the plurality of first knuckle body contact surfaces include the third and fourth parallel contact surfaces, and wherein the plurality of steer arm contact surfaces include the first and second parallel contact surfaces.

12. The method of manufacturing of claim 1, further comprising joining fifth and sixth parallel contact surfaces of a tie rod arm semi-circular shape to seventh and eighth parallel contact surfaces, respectively, of a second knuckle body semi-circular shape to form a second circular bearing.

13. The method of manufacturing of claim 12, wherein the tie rod arm is integral with the fifth and sixth parallel contact surfaces.

14. The method of manufacturing of claim 12, wherein the first circular bearing and the second circular bearing are positioned about a common axis.

15. The method of manufacturing of claim 14, further comprising passing a pin through the first circular bearing and second circular bearing.

16. The method of manufacturing of claim 12, wherein the fifth and sixth parallel contact surfaces are elevated from a base surface of the tie rod arm semi-circular shape.

17. The method of manufacturing of claim 12, wherein the seventh and eighth parallel contact surfaces are elevated from a base surface of the second knuckle body semi-circular shape.

18. The method of claim 12, further comprising welding the knuckle body and the tie rod arm by fusing a plurality of second knuckle body contact surfaces and a plurality of tie rod arm contact surfaces via linear friction welding, the plurality of second knuckle body contact surfaces in direct contact with the plurality of tie rod arm contact surfaces during linear friction welding, wherein the plurality of second knuckle body contact surfaces include the seventh and eighth parallel contact surfaces, and wherein the plurality of tie rod arm contact surfaces include the fifth and sixth parallel contact surfaces.

* * * * *